Figure 1:
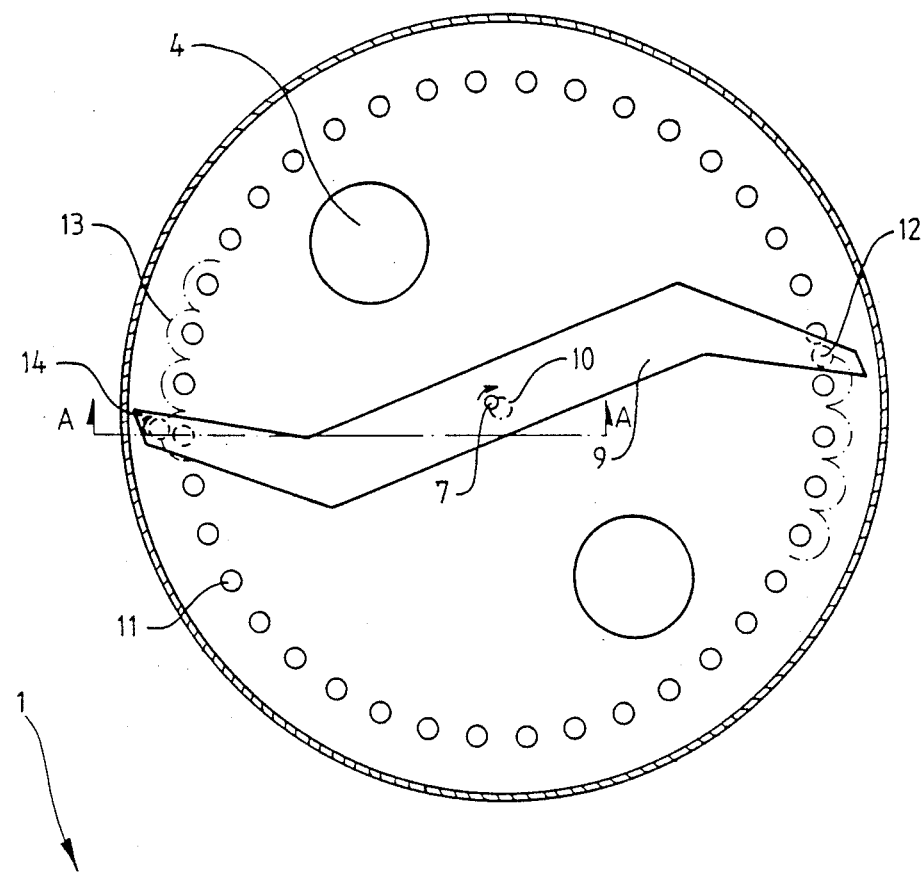

United States Patent [19]

Kilpeläinen et al.

[11] Patent Number: 4,979,861
[45] Date of Patent: Dec. 25, 1990

[54] DISCHARGE APPARATUS FOR A SILO

[75] Inventors: Ossi K. Kilpeläinen; Risto O. Mikkonen, both of Savonlinna, Finland

[73] Assignee: A. Ahlstrom Corporation

[21] Appl. No.: 341,130

[22] Filed: Apr. 20, 1989

[30] Foreign Application Priority Data

Apr. 25, 1988 [FI] Finland .................. 881926

[51] Int. Cl.⁵ .................. B65D 83/06; B65G 65/48
[52] U.S. Cl. .................. 414/306; 222/200; 222/404
[58] Field of Search .......... 414/304, 305, 306, 307, 414/308, 309, 310; 222/200, 333, 404, 478

[56] References Cited

U.S. PATENT DOCUMENTS

| | | | |
|---|---|---|---|
| 1,429,925 | 9/1922 | Candlot | 222/404 |
| 1,730,784 | 10/1929 | Rogginger | 222/404 X |
| 2,471,495 | 5/1949 | Pfau | 222/404 X |
| 2,861,544 | 11/1958 | Baltz | 414/306 |
| 3,050,201 | 8/1962 | Humphrey | 414/310 |
| 3,197,084 | 7/1965 | Van Der Lely et al. | 222/404 X |
| 3,203,703 | 8/1965 | Van Der Lely et al. | 222/404 X |
| 3,229,665 | 1/1966 | Baltz | 414/306 |
| 3,513,994 | 5/1970 | De Bower et al. | 414/310 |
| 3,648,860 | 3/1972 | Wennberg | 414/310 |
| 3,874,566 | 4/1975 | Miksitz | 222/404 |
| 3,896,943 | 7/1975 | Knutsen . | |
| 4,095,703 | 6/1978 | Weaver | 414/310 X |
| 4,099,633 | 7/1978 | Cantenot | 414/310 X |
| 4,217,996 | 8/1980 | Good | 222/404 |
| 4,451,192 | 5/1984 | Wood | 414/306 |
| 4,534,693 | 8/1985 | Weaver | 414/310 X |
| 4,708,567 | 11/1987 | Greeb | 414/310 |

FOREIGN PATENT DOCUMENTS

| | | | |
|---|---|---|---|
| 2448798 | 4/1975 | Fed. Rep. of Germany | 414/306 |
| 47328 | 7/1973 | Finland . | |

Primary Examiner—Frank E. Werner
Assistant Examiner—Robert S. Katz
Attorney, Agent, or Firm—Toren, McGeady & Associates

[57] ABSTRACT

In an apparatus for discharging a silo (1), at the bottom (3) of the silo, a discharge mechanism (9) with at least two arms is mounted in bearings on an eccentric trunnion (7) of a vertical drive shaft (5) centrally disposed in the silo. The movement of the discharge mechanism is guided by rollers (12) disposed at the ends of the discharge arms and by pins (11) disposed at the bottom of the silo, by way of which the rollers move along a substantially epicycloidal path around the pins (11) while the shaft rotates.

14 Claims, 2 Drawing Sheets

DISCHARGE APPARATUS FOR A SILO

The present invention relates to an apparatus for discharging fine material such as fiber pulp, chips or sawdust from a silo or the like through an opening or openings at the bottom of the silo.

In some earlier known arrangements for discharging material from the bottom of a silo, a conveying screw is employed which turns around the center shaft of the silo and extends radially from the wall of the silo to the discharge opening disposed in the center of the bottom of the silo. The turning movement of the conveying screw is, as disclosed in FI patent specification No. 51325, effected by, for example, a hydraulic means disposed at the outer end of the conveying screw and co-operating with a toothed step ring outside the silo.

In some other known arrangements for discharging material from the bottom of a silo, discharge arms attached to a drive shaft centrally disposed in the silo are used, said discharge arms being arranged to transfer material to the discharge opening or openings of the silo while the shaft rotates. The discharge arms are arranged so as to either turn continuously in one direction or to reciprocate, by a motor or hydraulic means. FI patent specification 47328 can be cited as an example of such arrangement.

An object of the invention is to provide an improved apparatus equipped with a discharge arm or discharge arms and receiving their driving power through a centrally disposed drive shaft.

The apparatus according to the invention is mainly characterized in that at the center of the discharge means, said discharge means having at least two arms, is mounted in bearings on a trunnion eccentrically disposed relative to the rotary drive shaft which is mounted in bearings centrally to the silo, and in that the movement of the discharge means is guided by members at the ends thereof and by countersurfaces arranged in the silo. In a preferred embodiment of the invention, rollers moving along a substantially epicycloidal path around pins disposed at the bottom of the silo have been mounted in bearings on the ends of the discharge arms.

The most significant advantage of the discharge apparatus according to the invention is that its driving torque requirement is significantly smaller than that for known apparatuses driven from the center. Correspondingly, the drive shaft and the means necessary for the transfer of the driving torque as well as the bearing, ducting and sealing means can be advantageously smaller in size.

Other possible advantages of the invention are as follows:

The small torque needed can be supplied to the discharge means downwardly from the roof of the silo, whereby ducts through the bottom can be totally avoided, the upper part of the silo being, however, free to be provided with means for distributing the material fed into the silo evenly on the whole cross sectional area of the silo.

The "sawing" movement reduces the power requirement (cf. the action in the cutting of bread) and intensifies the discharging process. Relatively fluid materials are discharged also when the discharge arm is moving away from the discharge opening.

Appropriate shaping of the end of the discharge arm, which discharge arm moves along a kind of epicycloidal path, contributes to the transfer of material from the vicinity of the wall towards the center, thereby efficiently preventing formation of channels.

With regard to the wearing of the bottom, the epicycloidal path is more favourable than a movement in the direction of the circumference.

Figure 2:
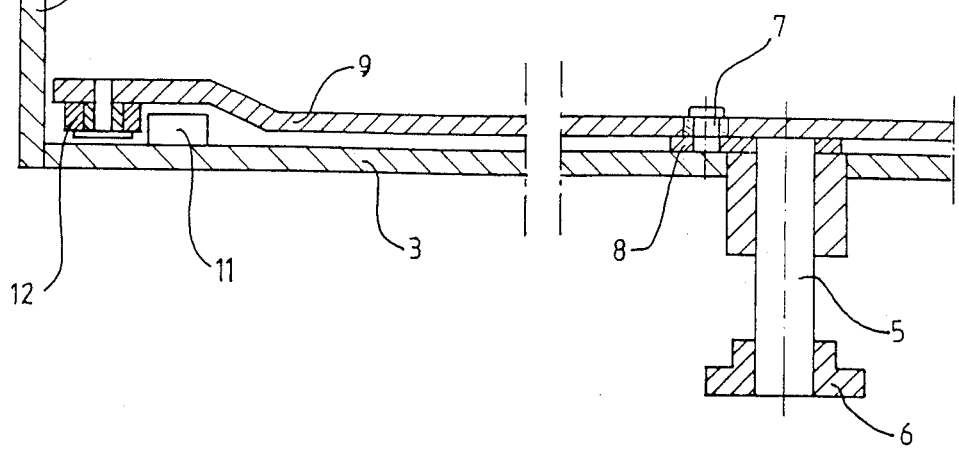
Figure 3:
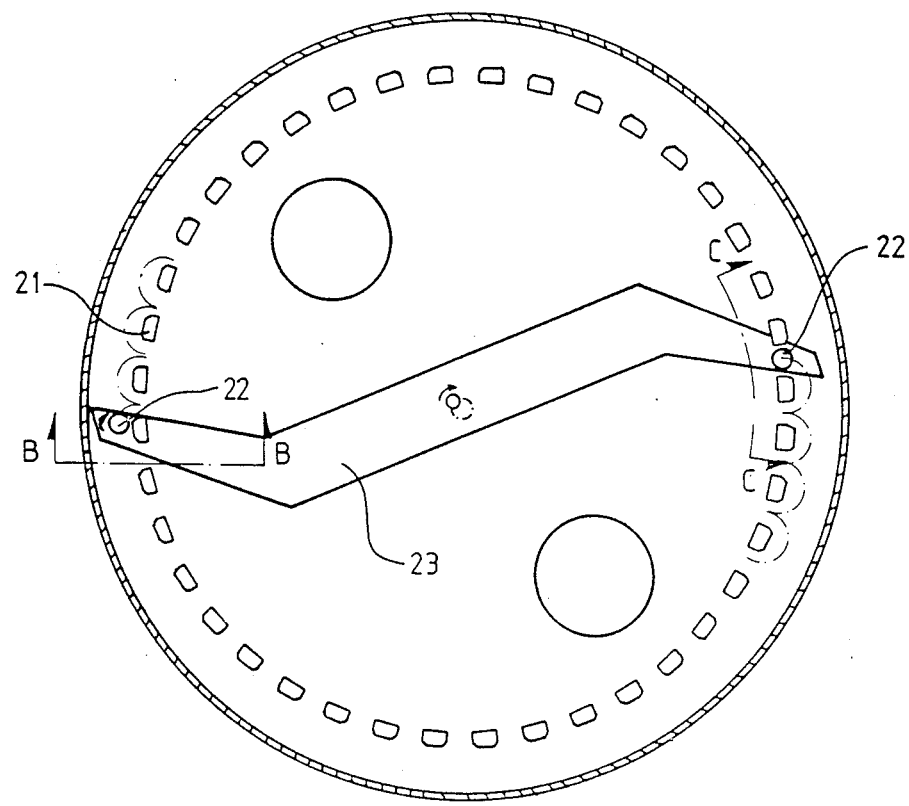
Figure 4:
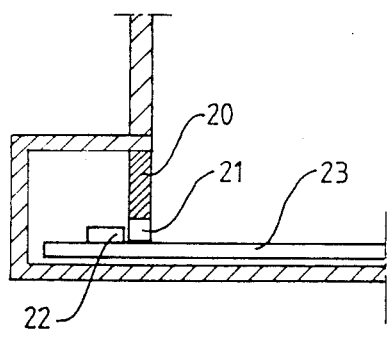
Figure 5:
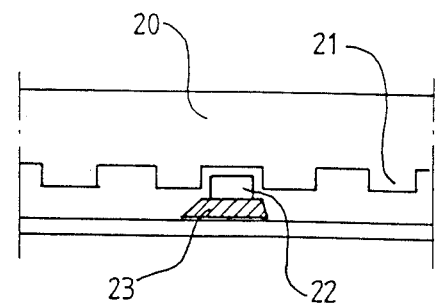

The invention will now be described further and in more detail, by way of example, with reference to the accompanying drawings, in which FIG. 1 is a plan view of an embodiment of the invention, FIG. 2 is a sectional view taken along line A—A of FIG. 1, FIG. 3 is a plan view of a second embodiment of the invention, FIG. 4 is a sectional view taken along line B—B of FIG. 3, FIG. 5 is a sectional view taken along line C—C of FIG. 3, FIG. 6 is a fragmentary plan view of a third embodiment of the invention, and FIG. 7 is a fragmentary plan view of a further alternative embodiment of the invention.

FIGS. 1 and 2 illustrate a typical construction in accordance with the invention. Reference number 1 refers to the lower part of the silo, said lower part having a cylindrical wall 2 and a planar bottom 3, said bottom being provided with two discharge openings 4.

A vertical, centrally disposed shaft 5 extends through the bottom 3, said shaft being rotatably mounted in bearings in a way known per se and sealed (in a manner not disclosed). One end of the shaft 5 extending outside of the silo is provided with a coupling 6, by means of which the shaft can be coupled to a drive mechanism (not shown). The other end of the shaft 5 is equipped with an eccentric trunnion 7, which is connected to the shaft by a bar 8 and whereon the center of a discharge means 9 with two arms is mounted in bearings, said discharge means being disposed at the bottom of the silo. While the shaft 5 rotates, the center of the discharge means moves along a circular path 10 around the shaft 5. At the bottom are disposed round pins 11 at equal distances from one another and arranged in a circle in the vicinity of the wall 3. Rollers 12 are mounted in bearings on both ends of the discharge means below the discharge arms and move along a substantially epicycloidal path 13 around the pins 11 thereby guiding the movement of the discharge means, forcing the discharge means to slowly rotate along the bottom.

When the shaft 5 starts to rotate, the trunnion 7 moves from the position shown in the FIGURE in the direction of the arrow and the roller 12 disposed at the end of the discharge means 9 is guided by the countersurfaces formed by the pins 11, primarily moving radially outwards. The roller at the opposite end of the discharge means moves along the epicycloidal path nearly in the direction of the circumference, starting after about a ¼ of a cycle to shift also radially towards the center in between the pins. At the same time, the roller on the right moves radially outwards and becomes released from the guidance of the pins when the shaft has rotated nearly ½ a cycle.

During the next ½ a cycle, the above described procedure is repeated at the opposite ends of the discharge means. The eccentricity e of trunnion 7 and the distance r of pins 11 from the center, the diameter of pins 11 and the distance between pins 11 are so dimensioned as to cause the discharge means to move all the time under control in such a manner that either the roller on the right or that on the left moving radially inwards comes between the pins irrespective of frictional variations of the material to be discharged or of like variants. In practice, r/e is 20 to 200 depending on the diameter of the silo.

The ends 14 of the discharge arms are wedge-like in shape so as to cause such to move in the direction of the circumference when they are pressed into pulp.

EXAMPLE

Torque requirements of a conventional discharge apparatus driven from the center:
n = number of discharge arms
r = radius of the bottom of the silo (design speed of the discharge arm)
q = load on the discharge arm
M = required torque $$M_1 = nx \frac{r}{2} xrxq = n/2 \; xr^2xq = r^2xq, \text{ if } n = 2$$

The torque brought to the discharge apparatus in accordance with the invention is at its maximum when the trunnion 7 moves perpendicularly to the discharge arm, whereby $M_2 2 \times r \times q \times e$, if the silo is provided with one discharge means with two arms.

$$\frac{M_1}{M_2} \sim \frac{r^2 q}{2rqe} = \frac{r}{2e} = 50$$

The invention enables construction of silos larger in diameter than those employed until today because the torque requirement of the discharge apparatus according to the invention is considerably smaller than that of conventional discharge apparatuses.

In the embodiment illustrated in FIGS. 3–5, a skirt 20 is attached to the wall of the silo at the lower part thereof, the lower edge of said skirt being provided with a plurality of pins 21 equally spaced apart from one another. The cross section of each pin is approximately quadrangular with rounded outer edges. The discharge means 23 is provided with rollers 22 disposed on top of the ends of the arms, which rollers, similarly to those in the means disclosed in FIGS. 1 and 2, when moving around the pins force the discharge means to slowly circulate in the silo.

In the embodiment shown in FIG. 6 with ratchet-like rotation control, each end of discharge means 30 is provided with a catch lever 31, which is pressed against a wall 32 of the silo by means of a spring, said wall being provided with a ring of tooth-formed barriers 33 (only partly shown) forming spaced-apart countersurfaces 34 and abutments for the catch lever. The catch lever and the toothing on the silo shell allow the movement of the discharge arm only in one direction and prevent it from moving in the other direction. A fixed catch lever or a spring 41 or like frictional gripping means of the discharge means 40 may alternatively abut on a silo wall 42 without toothing, as shown in FIG. 7, by means of friction. Friction conditions can be improved by lining the lower part of the wall of the silo with rubber, wood, plastics or the like.

We claim:
1. An apparatus for discharging fine material from the bottom (3) on the silo (1), comprising:
 a drive shaft (5) centrally and rotatable disposed in the silo;
 at least one discharge means (9, 23, 30) for transferring material, when said drive shaft rotates to at least one discharge opening (4) in the bottom of the silo, the discharge means including at least two arms which extend outwardly from a midpoint;
 an eccentric trunnion (7) rigidly connected to said drive shaft by a bar (8), said discharge means being mounted at its midpoint on said trunnion;
 a member (12, 22, 31, 41) arranged at the end of each of the arms of said discharge means; and
 counter surfaces (11, 21, 34, 42) disposed in the silo so as to interact with said members (12, 22, 31, 41) so that movement of said discharge mans is guided so that said discharge means executes a saw-like movement.

2. The apparatus as claimed in claim 1, characterized in that the counter surfaces (11) are disposed on the bottom (3) of the silo.

3. The apparatus as claimed in claim 2, characterized in that the counter surfaces (21) disposed the lower edge of a skirt (20) attached to the wall of the silo.

4. The apparatus as claimed in claim 1, 2 or 3, characterized in that the counter surfaces are formed by pins (11, 21) disposed equally spaced apart from each other in a circle adjacent the wall (2) of the silo (1).

5. The apparatus as claimed in claim 1, 2 or 3, characterize in that the counter surfaces are formed by a toothed ring (34) disposed in the lower part of the silo.

6. The apparatus as claimed in claim 5, characterized in that a spring-loaded catch lever (31) engageably abutting on one side surface (34) of the teeth (33) of the toothed ring is attached to the ends of the discharge means (30).

7. The apparatus as claimed in claim 4, characterized in that rollers (12, 22) for moving along on substantially epicycloidal path around the pins (11. 21) are mounted in bearings at the ends of the discharge means (9, 23).

8. The apparatus as claimed in claim 7, characterized in that the pins are round.

9. The apparatus as claimed in claim 7, characterized in that the pins are substantially quadrangular.

10. The apparatus as claimed in claim 11, characterized in that to each end of tho discharge means (40) is attached a spring-loaded catch lever or a spring (41), for retainably abutting on the wall (42) of the silo by means of friction.

11. The apparatus as claimed in claim 1, characterized in that r/e =20−200, where e = eccentricity of the crank shaft and r = distance between the counrerparts and the center of the silo.

12. An apparatus as defined in claim 1, wherein the drive shaft is mounted in the silo by way of bearings.

13. An apparatus as defined in claim 1, wherein the discharge means is connected to the trunnion by way of bearings.

14. An apparatus as defining claim 1, wherein the members connected to the ends of the arms are connected thereto by way of bearings.

* * * * *